United States Patent
Durach et al.

(10) Patent No.: US 7,136,734 B2
(45) Date of Patent: Nov. 14, 2006

(54) METHOD FOR CONTROLLING A SEAT ADJUSTMENT

(75) Inventors: Stephan Durach, Munich (DE); Danny Borke, Gammelsdorf (DE); Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/211,505

(22) Filed: Aug. 26, 2005

(65) Prior Publication Data

US 2005/0283293 A1 Dec. 22, 2005

Related U.S. Application Data

(63) Continuation of application No. PCT/EP2004/001448, filed on Feb. 16, 2004.

(30) Foreign Application Priority Data

Feb. 27, 2003 (DE) ................. 103 08 415

(51) Int. Cl.
*G06F 17/00* (2006.01)
(52) U.S. Cl. .............. 701/49; 701/36; 340/5.53
(58) Field of Classification Search ............. 701/36, 701/49; 340/5.1, 5.53; 318/466–468; 307/10.1; 296/63, 65.01
See application file for complete search history.

(56) References Cited

U.S. PATENT DOCUMENTS 4,797,824 A * 1/1989 Sugiyama et al. ........... 701/49
5,008,946 A * 4/1991 Ando .......................... 382/104
5,983,147 A 11/1999 Krumm
6,442,465 B1 * 8/2002 Breed et al. ................. 701/45
6,614,344 B1 * 9/2003 Frasher et al. ............ 340/425.5
6,668,221 B1 * 12/2003 Harter et al. ................ 701/36
2002/0138181 A1 * 9/2002 Mori et al. .................... 701/1
2003/0220725 A1 * 11/2003 Harter et al. ................ 701/36

FOREIGN PATENT DOCUMENTS

| DE | 199 47 062 A1 | 4/2000 |
| DE | 102 46 318 A1 | 4/2004 |
| WO | WO 02/08022 A2 | 1/2002 |

OTHER PUBLICATIONS

German Office Action dated Sep. 12, 2003 with English translation thereof (Five (5) pages).
PCT Search Report dated Jun. 15, 2004 w/English translation of relevant portion (Four (4) pages).

\* cited by examiner

*Primary Examiner*—Gary Chin
(74) *Attorney, Agent, or Firm*—Crowell & Moring LLP

(57) ABSTRACT

The invention relates to a method for controlling a seat adjustment by means of a passenger compartment camera system, with which images of at least one portion of an individual sitting on a vehicle seat are recorded, and by means of a control unit, via which at least one type of movement of the individual sitting on the vehicle seat is identified from a series of images. The identified type of movement is compared with types of movement already stored in the control unit. When a stored type of movement is identified, a seat adjustment is carried out that is assigned to this type of movement.

10 Claims, 1 Drawing Sheet

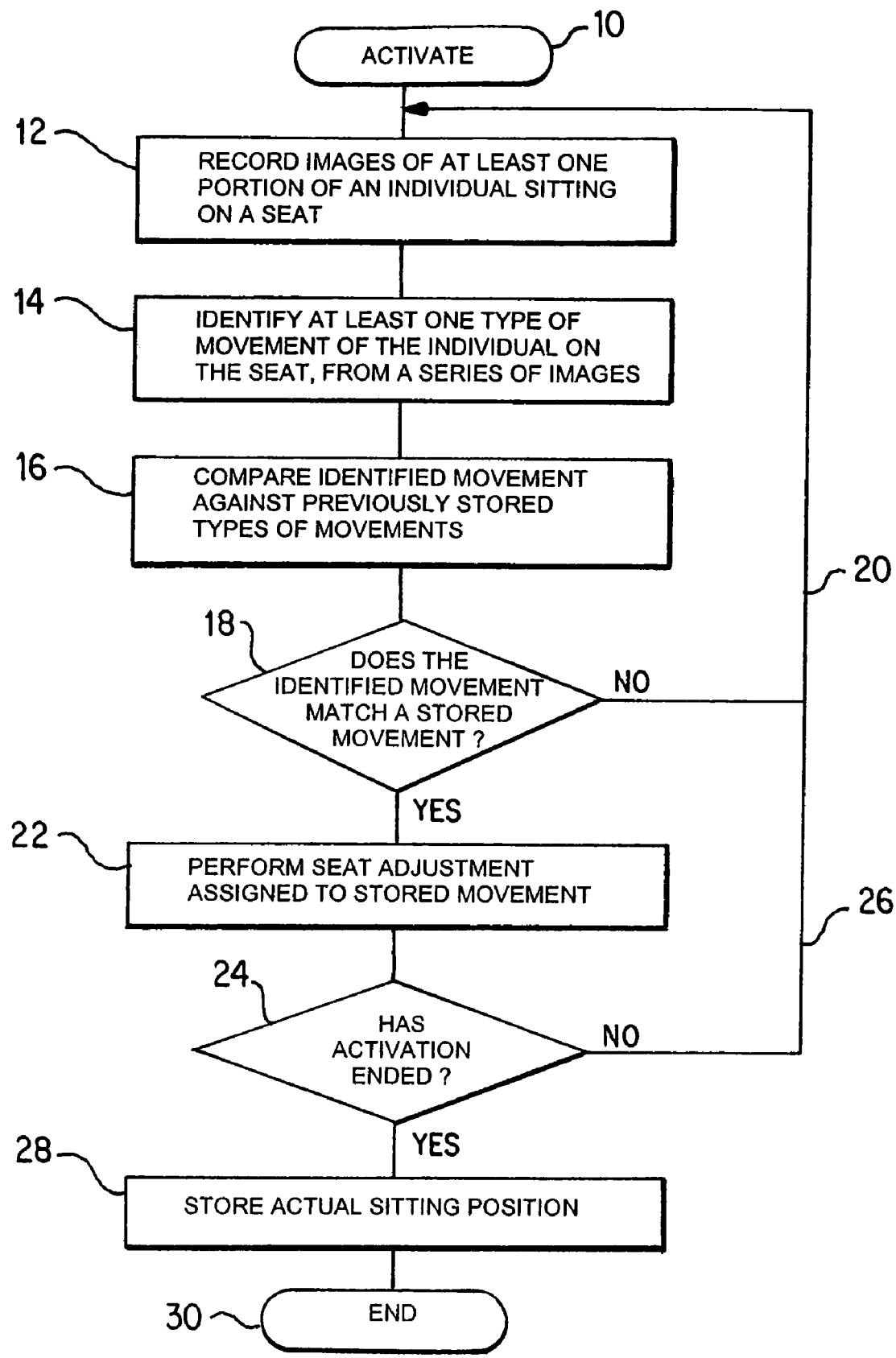

METHOD FOR CONTROLLING A SEAT ADJUSTMENT

CROSS-REFERENCE TO RELATED APPLICATIONS

This application is a continuation of PCT Application No. PCT/EP2004/001448 filed on Feb. 16, 2004, which claims priority to German Application No. 103 08 415.0 filed Feb. 27, 2003.

The invention relates to a method of controlling a seat adjustment.

It is known that seat adjustments in motor vehicles may be implemented by the use of electric motors. The controlling of the electric motors takes place by way of an operating element, such as a lever or a switch, by which a person may carry out a desired seat displacement or adjustment.

From International Patent document WO 02/0800222 A2, an arrangement is known in which a person in a vehicle seat can be identified by the use of a camera system, and the seat adjustment corresponding to the identified person automatically takes place by the use of previously stored seat position data.

German Patent document DE 102 46 318, which is still unpublished, also describes an arrangement and a method for automatic seat adjustment. By the use of a camera system, the person sitting in the car seat is not only identified, but the entire sitting position is recorded. This actual sitting position is compared with the pertaining stored sitting position of the identified person, and the seat adjustment takes place as a function thereof.

No intuitive seat adjustment can be carried out from the known methods and arrangements.

It is an aspect of the invention, to improve upon the known methods of controlling a seat adjustment.

According to the invention, a method is provided for controlling a seat adjustment by using a vehicle compartment camera system with which images are recorded of at least one portion of an individual sitting in a vehicle seat, and by using a control unit, via which, from a sequence of images, at least one type of movement of the person sitting in the vehicle seat is identified and the identified type of movement is compared with types of movement already stored in the control unit. When a stored type of movement is recognized, a seat adjustment is carried out that is assigned to this type of movement. Advantageous further developments are described and claimed herein.

Other objects, advantages and novel features of the present invention will become apparent from the following detailed description of the invention when considered in conjunction with the accompanying drawings.

BRIEF DESCRIPTION OF THE DRAWING

FIG. 1 is a flowchart illustrating an exemplary operation of the method according to the invention.

DETAILED DESCRIPTION OF THE DRAWING

FIG. 1 is a flowchart illustrating an exemplary method of controlling a seat adjustment using a vehicle compartment camera system and a control unit. The method starts (10) by recording images of at least one portion of an individual sitting on a seat (12). At least one type of movement of the individual on the seat is detected or identified from a series of the recorded images (14). The identified movement is compared against previously stored types of movements (16). The method then determines whether the identified movement matches a stored movement (18). If there is no match, then the method continues to record images and identify them for comparison (20). If, however, there is a match, then a seat adjustment is performed that is assigned to the stored movement (22). Next, the method determines whether the activation period has ended (24). If not, the method continues to operate (26). If activation has ended, either automatically or manually, then, in one embodiment, the actual sitting position assigned to the occupant is stored (28) before the process ends (30).

While the method of the invention is described with respect to a vehicle seat in conjunction with the use of a vehicle compartment camera system and a vehicle control unit, it will be understood that the method may be used in conjunction with any seat that may be adjustable dependent upon the occupant.

By use of the method according to the invention, the occupant's movement is to be assigned to a displacement of the seat. If a movement pattern or a movement type is detected, a certain seat adjustment is carried out. This may either be a complete adjustment of the seat (that is, the entire seat adapts itself, for example, to the occupant's movement) or only individual seat parameters are displaced.

This method is particularly advantageous if the person sitting in the vehicle seat is enabled to intuitively adjust his seat. The seat adjustment follows the person's type of movement. An intuitive movement can take place, for example, by means of the occupant's head. In contrast to detecting hand gestures, the detection of the occupants' head position and head movements may be implemented relatively simply by the use of a vehicle compartment camera system. If the person wants to, for example, raise the seat surface in order to have a better view, he can, for example, move his body or head upward. The camera system records this movement, and the control unit detects the corresponding type of movement. If such a type of movement is stored in the control unit, an assigned seat adjustment is carried out, in this case, for example, a raising of the seat surface.

The new legal regulation concerning air bag systems in the US (FMVSS208 of NHTSA) creates the requirement for a vehicle compartment sensing system for determining the front passenger's seat occupation and head position. For several premium class automobiles, a vehicle compartment camera system, usually a 3D-camera system, is provided for this purpose. It is advantageous to use this already existing camera system also for controlling a seat adjustment. The motor vehicle manufacturer will, therefore, have no additional costs for the camera system.

For the seat adjustment according to the invention, at least the (body) part of a person sitting in a vehicle seat, which is moving intuitively, has to be detected for the seat adjustment. The analysis of the head position and the head movements is particularly advantageous.

For reasons of cost and/or space, the control unit can be integrated in the already existing control equipment for the seat adjustment. However, the control unit may also be connected by way of a data transmission unit with the seat adjustment. In this case, only the data for the displacement of one or more seat parameters and/or the call of a prestored seat adjustment is/are transmitted.

The control according to the invention is switched on or off either arbitrarily or automatically.

Advantageously, the control of the seat adjustment according to the invention is activated by use of an operating element and/or as a function of operating parameters of the vehicle. This prevents an unwanted seat adjustment or seat displacement from being carried out. For example, an operating element is operated for activating the control. The control may also be activated by speech input, for example, by the use of a keyword, by use of gestures, or by use of another man-machine interaction function. As an alternative, the control according to the invention may automatically be activated as a function of certain operating parameters of the vehicle (for example, at the start of the engine or at a low speed).

When the control of the seat adjustment according to the invention is active, it is advantageously active for a predefined time. As an alternative, the control of the seat adjustment is deactivated by use of an operating element. The deactivation may take place by key pressure, by voice input, by gestures, by another man-machine interaction function, or the like.

Advantageously, after the termination of the seat adjustment, the actual sitting position is assigned to the person sitting in the vehicle seat and is stored in the control unit. As soon as the control of the seat adjustment is deactivated, the seat adjustment is stored. If the vehicle is used by several persons, a clear assignment has to take place by which an identification of the person (as known, for example, by means of International Patent Document WO 02/0800222 A2) or at least by differentiating the persons within user groups. The differentiation between persons from a limited group of known persons stored in the system clearly requires smaller computing resources than known person detection methods. If, for example, at a later point in time, the system again recognizes a certain person, the seat adjustment last stored by this person can automatically take place. The seat adjustment is therefore more user friendly and comfortable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling a seat adjustment using a seat compartment camera system and a control unit operably configured to carry out adjustments of a seat, the method comprising the acts of:
   recording images of at least one portion of an individual sitting in a seat using the seat compartment camera system;
   identifying, from a sequence of the recorded images, at least one type of movement of the individual sitting in the seat;
   comparing the identified type of movement with types of movement previously stored; and
   when a stored type of movement matches the identified type of movement, a seat adjustment is carried out that is assigned to the stored type of movement,
   wherein the seat is a vehicle seat and the camera system is a vehicle compartment camera system, and
   wherein the method of controlling the seat adjustment is deactivated as a function of operating parameters of the vehicle.

2. The method according to claim 1, wherein the method of controlling the seat adjustment is activated for a predefined time.

3. The method according to claim 1, further comprising the act of assigning an actual sitting position to the individual sitting in the seat and storing the assigned actual sitting position in the control unit after seat adjustment is terminated.

4. A method of controlling a seat adjustment using a seat compartment camera system and a control unit operably configured to carry out adjustments of a seat, the method comprising the acts of:
   recording images of at least one portion of an individual sitting in a seat using the seat compartment camera system;
   identifying, from a sequence of the recorded images, at least one type of movement of the individual sitting in the seat;
   comparing the identified type of movement with types of movement previously stored; and
   when a stored type of movement matches the identified type of movement, a seat adjustment is carried out that is assigned to the stored type of movement,
   wherein the seat is a vehicle seat and the camera system is a vehicle compartment camera system, and
   wherein the method is activated as a function of operating parameters of the vehicle.

5. The method according to claim 4, wherein the method of controlling the seat adjustment is activated for a predefined time.

6. The method according to claim 4, wherein the method of controlling the seat adjustment is deactivated via at least one of an operating element and as a function of the operating parameters of the vehicle.

7. The method according to claim 4, further comprising the act of assigning an actual sitting position to the individual sitting in the seat and storing the assigned actual sitting position in the control unit after seat adjustment is terminated.

8. A method of controlling a seat adjustment, the method comprising the acts of:
   determining whether an operating element is operated;
   determining whether operating parameters satisfy predetermined operating parameters, wherein when the operating element is operated and the operating parameters satisfy the predetermined operating parameters, the method comprises the acts of
   recording images of at least one portion of an individual sitting in a seat using a seat compartment camera system;
   identifying, from a sequence of the recorded images, at least one type of movement of the individual sitting in the seat;
   comparing the identified type of movement with types of movement previously stored; and
   when a stored type of movement matches the identified type of movement, a seat adjustment is carried out that is assigned to the stored type of movement.

9. The method according to claim 8, wherein the method is activated and deactivated by one of a key pressure, a voice input and a gesture, and as a function of the operating parameters.

10. The method according to claim 8, wherein the operating parameters comprise a starting of an engine and traveling at a low speed.

* * * * *